(12) United States Patent
Park et al.

(10) Patent No.: US 12,148,096 B2
(45) Date of Patent: Nov. 19, 2024

(54) METHOD AND DEVICE FOR OUTPUTTING LARGE-CAPACITY 3D MODEL FOR AR DEVICE

(71) Applicant: ELECTRONICS AND TELECOMMUNICATIONS RESEARCH INSTITUTE, Daejeon (KR)

(72) Inventors: Jeung Chul Park, Daejeon (KR); Wookho Son, Daejeon (KR); Beom Ryeol Lee, Daejeon (KR); Yongho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 209 days.

(21) Appl. No.: 17/973,817

(22) Filed: Oct. 26, 2022

(65) Prior Publication Data

US 2023/0237741 A1 Jul. 27, 2023

(30) Foreign Application Priority Data

Jan. 26, 2022 (KR) ........................ 10-2022-0011536

(51) Int. Cl.
*G06T 17/20* (2006.01)
*G06T 3/40* (2006.01)
(Continued)

(52) U.S. Cl.
CPC ................ *G06T 17/20* (2013.01); *G06T 3/40* (2013.01); *G06T 7/194* (2017.01); *G06T 9/00* (2013.01);
(Continued)

(58) Field of Classification Search
None
See application file for complete search history.

(56) References Cited

U.S. PATENT DOCUMENTS 8,077,906 B2  12/2011  Yu et al.
8,270,704 B2  9/2012  Kim et al.
(Continued)

FOREIGN PATENT DOCUMENTS

KR    1020080052338 A    6/2008
KR    10-1803474 B1    11/2017
(Continued)

OTHER PUBLICATIONS

Smolic et al. Interactive 3-D video representation and coding technologies, Dec. 2005, IEEE, 98-110 (Year: 2005).*
(Continued)

*Primary Examiner* — Robert J Craddock
(74) *Attorney, Agent, or Firm* — Rabin & Berdo, P.C.

(57) ABSTRACT

Provided is a method and device for outputting a large-capacity 3D model for an augmented reality (AR) device. A method of outputting a large-capacity 3D model for an AR device includes generating a multi-texture and a 3D mesh based on a multi-view image, generating a 3D model using the multi-texture and the 3D mesh, and transmitting, to the AR device, an image of the 3D model in a view, to which a camera of the AR device is directed, according to camera movement and rotation information of the AR device, and the AR device outputs the image in the view, to which the camera is directed.

17 Claims, 13 Drawing Sheets

(51) Int. Cl.
    *G06T 7/194*       (2017.01)
    *G06T 9/00*        (2006.01)
    *G06T 15/04*       (2011.01)
    *G06T 19/00*       (2011.01)
    *H04N 13/351*     (2018.01)

(52) U.S. Cl.
    CPC ............ *G06T 15/04* (2013.01); *G06T 19/006* (2013.01); *H04N 13/351* (2018.05); *G06T 2207/10024* (2013.01)

(56) References Cited

U.S. PATENT DOCUMENTS

| | | |
|---|---|---|
| 9,076,257 B2 | 7/2015 | Sharma et al. |
| 2006/0284880 A1* | 12/2006 | Zhou ........................ G06T 15/04 345/582 |

FOREIGN PATENT DOCUMENTS

| | | |
|---|---|---|
| KR | 1020200000363 A | 1/2020 |
| KR | 102108480 B1 | 5/2020 |
| KR | 1020210155386 A | 12/2021 |

OTHER PUBLICATIONS

Jeong-Sun Park et al., "Real-time 3D model generation system using multi-view images", Journal of Digital Contents Society, vol. 18, No. 2, pp. 383-392, Apr. 2017; with English abstract.

* cited by examiner

METHOD AND DEVICE FOR OUTPUTTING LARGE-CAPACITY 3D MODEL FOR AR DEVICE

CROSS-REFERENCE TO RELATED APPLICATION

This application claims the benefit of Korean Patent Application No. 10-2022-0011536 filed on Jan. 26, 2022, in the Korean Intellectual Property Office, the entire disclosure of which is incorporated herein by reference for all purposes.

BACKGROUND

1. Field of the Invention

The present disclosure relates to a method and device capable of outputting a large-capacity 3D mesh model to an augmented reality (AR) device.

2. Description of the Related Art

Microsoft and Magic Leap have respectively released HoloLens and Magic Leap One, which are capable of creating mixed reality (MR). Also, Nreal has released Nreal Light, which are AR glasses in the form of glasses.

An MR device may produce a scene in which virtual content is realistically synthesized with real content in the same space in the real world. MR content of a related art is content in which a virtual object is uploaded to a terminal and the virtual object is able to be controlled through interaction using the hands.

However, when the terminal performs rendering for a high-quality and large-capacity 3D model, a large memory is required for an application performing the rendering, and therefore, the execution of the application may become slow.

On the other hand, when a server performs rendering for a large-capacity 3D model and transmits the rendered image to an AR device, real-time transmission may not be performed due to the capacity of the rendered image, which may cause a delay of an image output by the AR device or the real-time output may not be performed.

Therefore, there is a demand for a method capable of rendering a high-quality and large-capacity 3D model, which is difficult to be uploaded to a terminal, and outputting a high-quality image.

SUMMARY

The present disclosure may provide a method and device for rendering only an image in a view, to which a camera of an augmented reality (AR) device is directed, and outputting the rendered image to the AR device, to provide a user an image having a resolution corresponding to a large-capacity 3D model, without transmitting large-capacity information.

Technical Solutions

A method of outputting a large-capacity 3D model for an augmented reality (AR) device, according to an example embodiment, may include generating a multi-texture and a 3D mesh based on a multi-view image, generating a 3D model using the multi-texture and the 3D mesh, and transmitting, to the AR device, an image of the 3D model in a view, to which a camera of the AR device is directed, according to camera movement and rotation information of the AR device, and the AR device may output the image in the view, to which the camera is directed.

In the method according to an example embodiment, the generating the multi-texture and the 3D mesh may include obtaining the multi-view image, encoding the multi-view image to generate the multi-texture, and generating the 3D mesh by applying a perspective correction interpolation method to the multi-view image.

In the method according to an example embodiment, the generating the multi-texture may include converting the multi-view image into an RGB image, converting the RGB image into a YUV image, and encoding the YUV image to generate the multi-texture.

In the method according to an example embodiment, the generating the 3D mesh may include generating a mask image by separating a foreground from the multi-view image, generating a surface voxel by projecting a 3D space with the mask image, and generating the 3D mesh by applying the perspective correction interpolation method to the surface voxel.

In the method according to an example embodiment, the generating the multi-texture and the 3D mesh may include generating the multi-texture and the 3D mesh in parallel by inputting the multi-view image to a thread pool for generating the multi-texture and a thread pool for generating the 3D mesh.

In the method according to an example embodiment, the generating the 3D model may include generating a 3D model by applying the multi-texture to the 3D mesh by using a shader.

In the method according to an example embodiment, the transmitting the image to the AR device may include receiving, from the AR device, the camera movement and rotation information of the AR device, rendering the image of the 3D model in the view, to which the camera is directed, according to the camera movement and rotation information of the AR device to generate a rendered image, and encoding the rendered image and transmitting the rendered image to the AR device.

In the method according to an example embodiment, the AR device may perform operations of decoding the rendered image from received information, and texturing the rendered image into a raw image and outputting the rendered image to a display of the AR device.

In the method according to an example embodiment, the AR device may change a size of the raw image by controlling a size of a canvas according to a position of the camera of the AR device before texturing the rendered image into the raw image.

A method of generating a large-capacity 3D model for an AR device, according to an example embodiment, may include obtaining a multi-view image, encoding the multi-view image to generate a multi-texture, generating a 3D mesh by applying a perspective correction interpolation method to the multi-view image, and rendering the multi-texture and the 3D mesh in Unity to generate a 3D model.

In the method according to an example embodiment, the generating the multi-texture may include converting the multi-view image into an RGB image, converting the RGB image into a YUV image, and encoding the YUV image to generate the multi-texture.

In the method according to an example embodiment, the generating the 3D mesh may include generating a mask image by separating a foreground from the multi-view image, generating a surface voxel by projecting a 3D space with the mask image, and generating the 3D mesh by applying the perspective correction interpolation method to the surface voxel.

In the method according to an example embodiment, the generating the 3D model may include generating a 3D model by applying the multi-texture to the 3D mesh by using a shader.

A method of outputting a large-capacity 3D model for an AR device, according to an example embodiment, may include receiving a 3D model generated based on a multi-view image and camera movement and rotation information of the AR device, rendering an image of the 3D model in a view, to which the camera is directed, according to the camera movement and rotation information of the AR device to generate a rendered image, and encoding the rendered image and transmitting the rendered image to the AR device, and the AR device may output the image in the view, to which the camera is directed.

In the method according to an example embodiment, the AR device may perform operations of decoding the rendered image from received information, and texturing the rendered image into a raw image and outputting the rendered image to a display of the AR device.

In the method according to an example embodiment, the AR device may change a size of the raw image by controlling a size of a canvas according to a position of the camera of the AR device before texturing the rendered image into the raw image.

In the method according to an example embodiment, the 3D model may be generated by rendering, in Unity, a multi-texture generated by encoding the multi-view image and a 3D mesh generated by applying a perspective correction interpolation method to the multi-view image.

According to an example embodiment, only the image of the view, to which the camera of the AR device is directed, may be rendered and output to the AR device, such that an image having a resolution corresponding to the large-capacity 3D model may be provided to a user, without transmitting large-capacity information.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings. A method of outputting a large-capacity 3D model for an augmented reality (AR) device, according to an example embodiment, may be performed by a large-capacity 3D model output device for an AR device 100.

Figure 1:
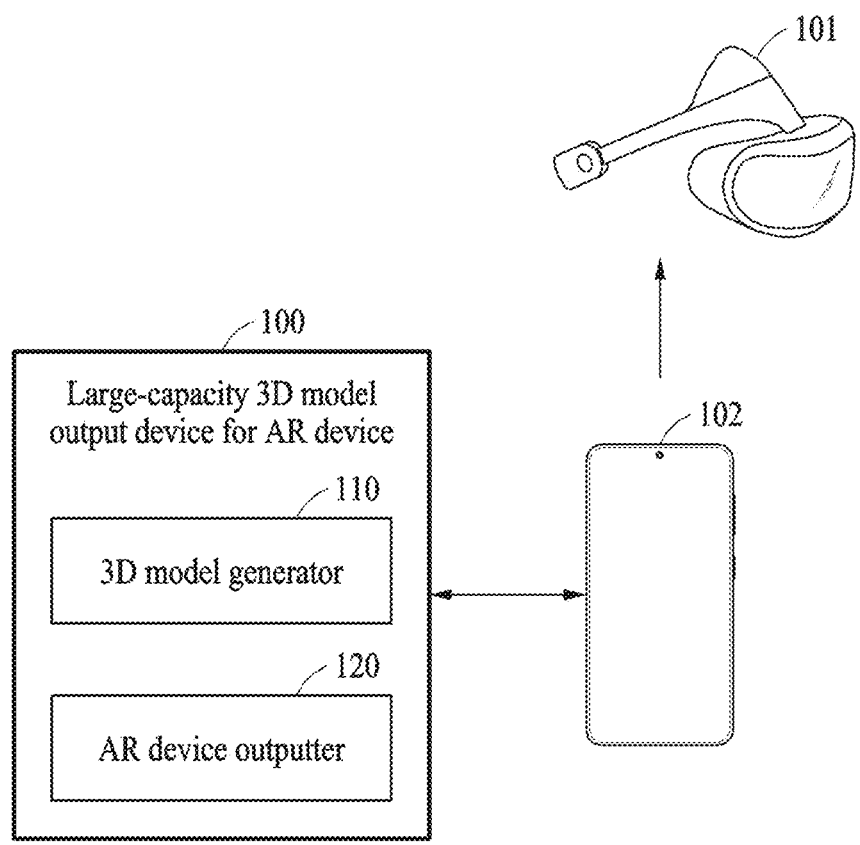
FIG. 1 is a diagram illustrating a large-capacity 3D model output device for an augmented reality (AR) device according to an example embodiment.

FIG. 1 is a diagram illustrating a large-capacity 3D model output device for an AR device according to an example embodiment.

The large-capacity 3D model output device for the AR device 100 may include a 3D model generator 110 and an AR device outputter 120, as shown in FIG. 1. In this case, the 3D model generator 110 and the AR device outputter 120 may be modules each included in different processes or one process. For example, the large-capacity 3D model output device for the AR device 100 may be a device having higher data processing performance than a server or a mobile terminal 102, such as a personal computer (PC).

In addition, the 3D model generator 110 may be a PC defined as a client, the AR device outputter 120 may be a server or a PC defined as a server, and the large-capacity 3D model output device for the AR device 100 may be a 3D model output system including a client and a server.

The mobile terminal 102 may be a portable terminal, such as a mobile phone or a tablet, which is capable of communicating with an AR device 101 and the large-capacity 3D model output device for the AR device 100. In addition, the mobile terminal 102 may receive AR device camera information from the AR device 101 and transmit the AR device camera information to the large-capacity 3D model output device for the AR device 100. In this case, the AR device camera information may include camera movement and rotation information of the AR device 101.

The 3D model generator 110 may generate a multi-texture and a 3D mesh, based on a multi-view image. In addition, the 3D model generator 110 may generate a 3D model by using the multi-texture and the 3D mesh.

The AR device outputter 120 may generate a rendered image of the 3D model in a view, to which a camera of the AR device 101 is directed, according to the camera movement and rotation information of the AR device 101, and transmit the rendered image to the mobile terminal 102. In addition, the mobile terminal 102 may transmit, to the AR device 101, the rendered image received from the large-capacity 3D model output device for the AR device 100.

In this case, the AR device 101 may output the image of a view, to which the camera of the AR device 101 is directed.

The large-capacity 3D model output device for the AR device 100 may render only the image of the view, to which the camera of the AR device 101 is directed, and transmit the rendered image to the AR device 101, such that an image having a resolution corresponding to the large-capacity 3D model may be provided to a user, without transmitting large-capacity information.

Figure 2:
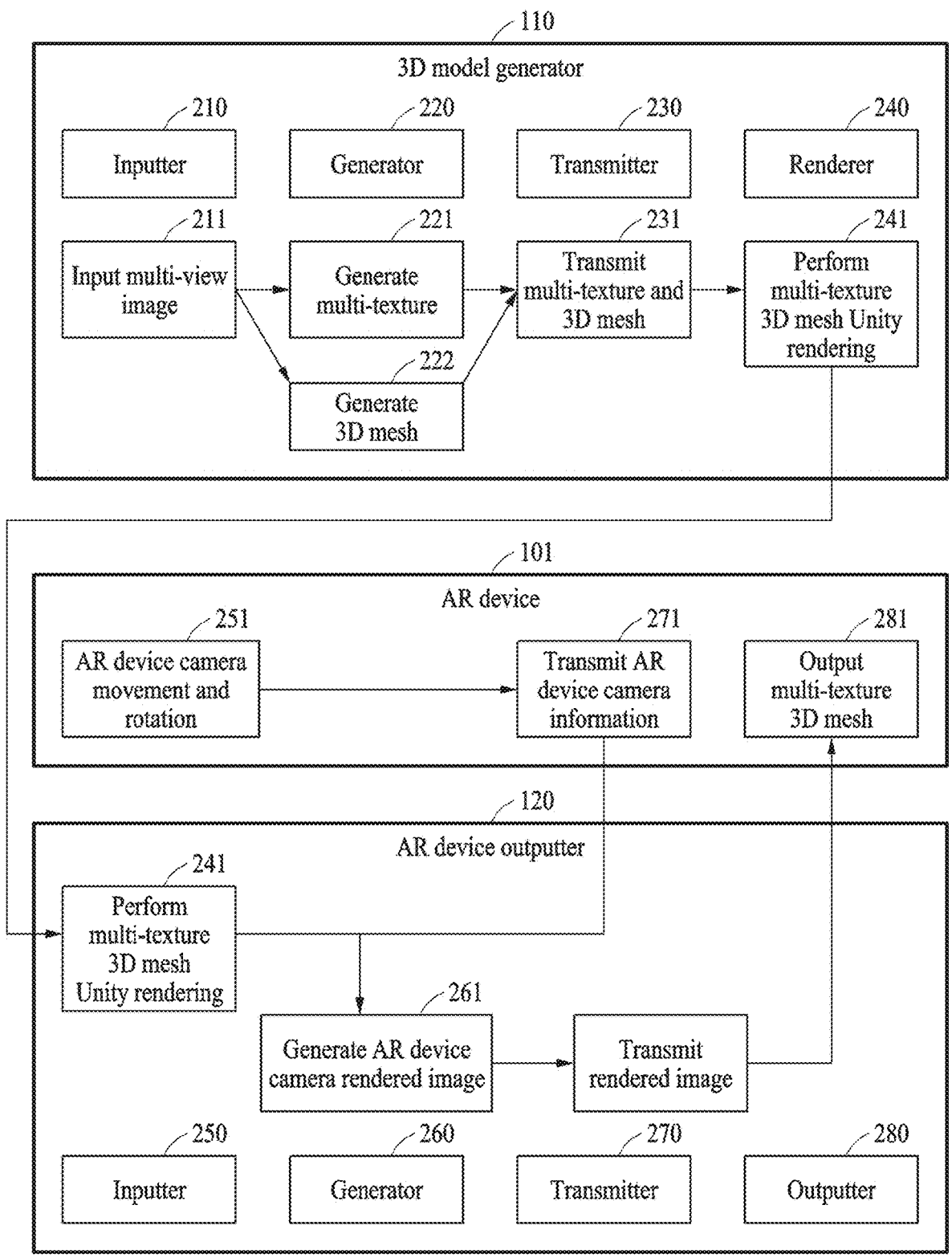
FIG. 2 is an example of a detailed configuration and an operation of a large-capacity 3D model output device for an AR device according to an example embodiment.

FIG. 2 is an example of a detailed configuration and an operation of the large-capacity 3D model output device for the AR device according to an example embodiment.

The 3D model generator 110 may include an inputter 210, a generator 220, a transmitter 230, and a renderer 240 as shown in FIG. 2. In this case, the inputter 210 may be a communicator or an input and output interface. In addition, the generator 220 and the renderer 240 may both be implemented as a process.

The inputter 210 may obtain a multi-view image 211. For example, a multi-view image may be a Bayer image of a single channel, such as RGRG.

The generator 220 may generate a multi-texture 221 by encoding the multi-view image 211 obtained by the inputter 210. In addition, the generator 220 may generate a 3D mesh 222 by applying a perspective correction interpolation method to the multi-view image 211 obtained by the inputter 210. At this time, as shown in FIG. 2, the generator 220 may perform the operation of generating the multi-texture 221 and the operation of generating the 3D mesh 222 in parallel.

The transmitter 230 may transmit the multi-texture 221 and the 3D mesh 222 generated by the generator 220 to the renderer 240. For example, the transmitter 230 may be a controller that controls information movement and an operation of a server or a PC.

The renderer 240 may perform multi-texture 3D mesh Unity rendering to generate a 3D model 241, which is subjected to the multi-texture 3D mesh Unity rendering. Specifically, the renderer 240 may generate the 3D model 241 by applying a multi-texture to a 3D mesh by using a shader. In addition, the renderer 240 may transmit the generated 3D model to the AR device outputter 120.

The AR device 101 may identify camera movement or rotation 251 of the AR device 101. In addition, the AR device 101 may generate camera movement and rotation information 271 of the AR device 101 according to the identified result. In this case, the AR device 101 may transmit the camera movement and rotation information 271 of the AR device 101 to the AR device outputter 120. In addition, when the AR device outputter 120 is a server or a PC defined as a server, an inputter 250 of the AR device outputter 120 may identify the camera movement or rotation 251 of the AR device 101 and generate the camera movement and rotation information 271 of the AR device 101 according to the identified result.

The AR device outputter 120 may include the inputter 250, a generator 260, and a transmitter 270 as shown in FIG. 2. In this case, the inputter 250 and the transmitter 270 may be a communicator or an input and output interface. In addition, the generator 260 may be implemented as a process.

The inputter 250 may receive the 3D model 241 from the renderer 240. In addition, the generator 260 may generate a rendered image 261 by rendering an image of the 3D model 241 in a view, to which the camera of the AR device 101 is directed, according to the camera movement and rotation information 271 of the AR device 101. In addition, the transmitter 270 may encode the rendered image and transmit the rendered image to the AR device 101.

An outputter 280 of the AR device 101 may restore a multi-texture 3D mesh image 281 from the rendered image 261 and output the multi-texture 3D mesh image 281. In this case, the outputter 280 of the AR device 101 may decode the rendered image 261 from information received from the transmitter 270. Next, the outputter 280 of the AR device 101 may texture the rendered image into a raw image and output the rendered image to a display of the AR device 101.

In this case, the outputter 280 of the AR device outputter 120 may change the size of the raw image by controlling the size of a canvas according to a position of the camera of the AR device 101, before texturing the rendered image into the raw image.

Figure 3:
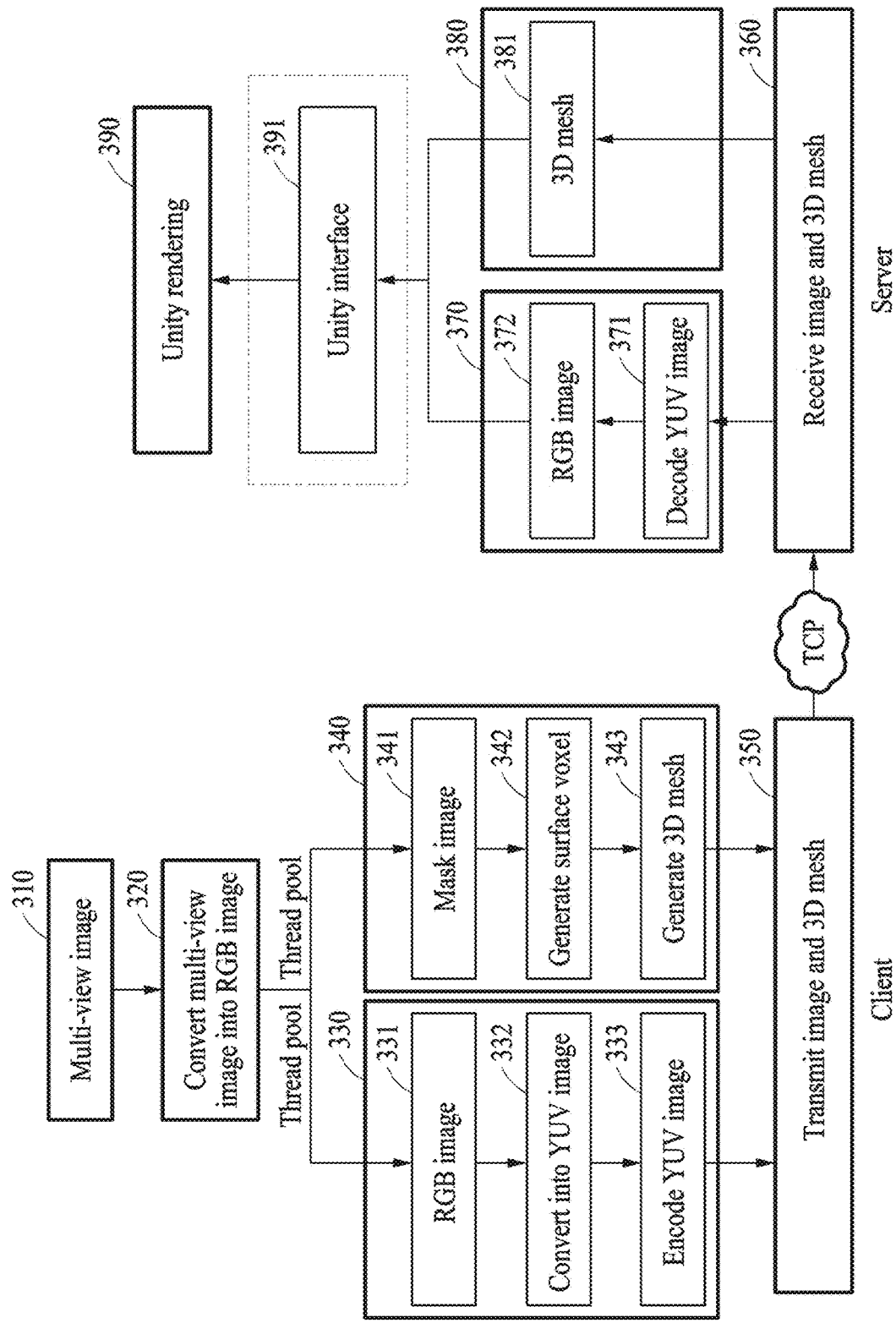
FIG. 3 is an example of generating a 3D model according to an example embodiment.

FIG. 3 is an example of generating a 3D model according to an example embodiment, in a case where the 3D model generator 110 is a PC defined as a client and the AR device outputter 120 is a server or a PC defined as a server.

In operation 310, the inputter 210 may obtain a multi-view image. For example, a multi-view image may be a Bayer image of a single channel, such as RGRG.

In operation 320, the generator 220 may convert the multi-view image received in operation 310 into an RGB image.

In operation 330, the generator 220 may encode the RGB image in operation 320 to generate a multi-texture. Operation 330 may include sub-operations 331, 332, and 333.

In sub-operation 331, a thread pool of the generator 220 may receive an RGB image converted from a multi-view image. In sub-operation 332, the thread pool of the generator 220 may convert the RGB image into a YUV image. In sub-operation 333, the thread pool of the generator 220 may encode the YUV image to generate a multi-texture. For example, the thread pool of the generator 220 may encode the YUV image by performing an H.264 encoding process using CUDA.

In operation 340, the generator 220 may generate a 3D mesh by applying a perspective correction interpolation method to the RGB image in operation 320. Operation 340 may include sub-operations 341, 342, and 343.

In sub-operation 341, the generator 220 may generate a mask image by separating the foreground from the RGB image. In sub-operation 342, the thread pool of the generator 220 may generate a surface voxel by projecting a 3D space with the mask image generated in sub-operation 341. In sub-operation 343, the thread pool of the generator 220 may generate a 3D mesh by applying the perspective correction interpolation method to the surface voxel generated in sub-operation 342.

In this case, operation 330 and operation 340 may be performed in parallel as shown in FIG. 3.

In operation 350, the transmitter 230 may transmit a signal including the multi-texture and the 3D mesh generated by the generator 220 to the inputter 250 of the AR device outputter 120. For example, the transmitter 230 may transmit the signal including the multi-texture and the 3D mesh by using a transmission control protocol (TCP).

In operation 360, the inputter 250 may receive a signal including the multi-texture and a 3D mesh 381.

In operation 370, the generator 260 of the AR device outputter 120 may restore the multi-texture from the signal received in operation 360. Specifically, in operation 371, the generator 260 may decode the multi-texture and restore the YUV image. In addition, in operation 372, the generator 260 may convert the YUV image into an RGB image.

In operation 380, the generator 260 may restore the 3D mesh 381 from the signal received in operation 360.

In operation 391, the generator 260 may input the 3D mesh 381 and the RGB image obtained from conversion in operation 372 to a Unity Interface.

A transfer library used between the 3D model generator 110, which is a PC defined as a client, and the AR device outputter 120, which is a server or a PC defined as a server (client-server), may be a C++ library. However, since a language used in Unity is C#, it is necessary to check a method of calling a C++ library (DLL) in C#.

In a version of Unity 5.x, a general C++ library is used by calling a class, however in the subsequent version (Unity 2017.x), it is necessary to follow a Unity interface process, in order to use the C++ library in Unity. The Unity interface may include two header files IUnityGraphic.h and IUnityInterface.h in the 3D mesh 381 and the RGB image obtained from conversion in operation 372. In this case, since IUnityInterface.h is included in IUnityGraphic.h, only IUnityGraphics.h needs to be called. A renderer used in Unity is connected into IUnityGrahpics.h.

In operation 390, the generator 260 may generate a 3D model by performing multi-texture 3D mesh Unity rendering. Specifically, the generator 260 may generate a 3D model by applying a multi-texture to a 3D mesh by using a shader.

Figure 4:
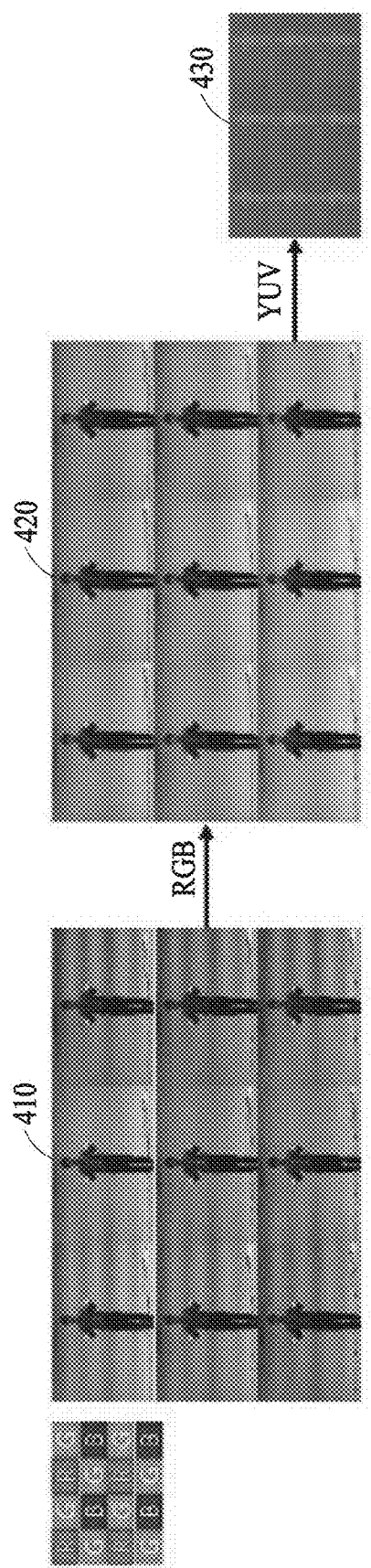
FIG. 4 is an example of generating a multi-texture according to an example embodiment.

FIG. 4 is an example of generating a multi-texture according to an example embodiment.

In operation 221, a multi-view image 410 obtained by the inputter 210 may be a Bayer image of a single channel, such as RGRG.

In this case, the generator 220 may convert the multi-view image 410 into an RGB image 420.

Next, the generator 220 may convert the RGB image 420 into a YUV image 430. In this case, the size of the RGB image 420 may be reduced to its ¼ while the RGB image 420 is converted into the YUV image 430.

Figure 5:
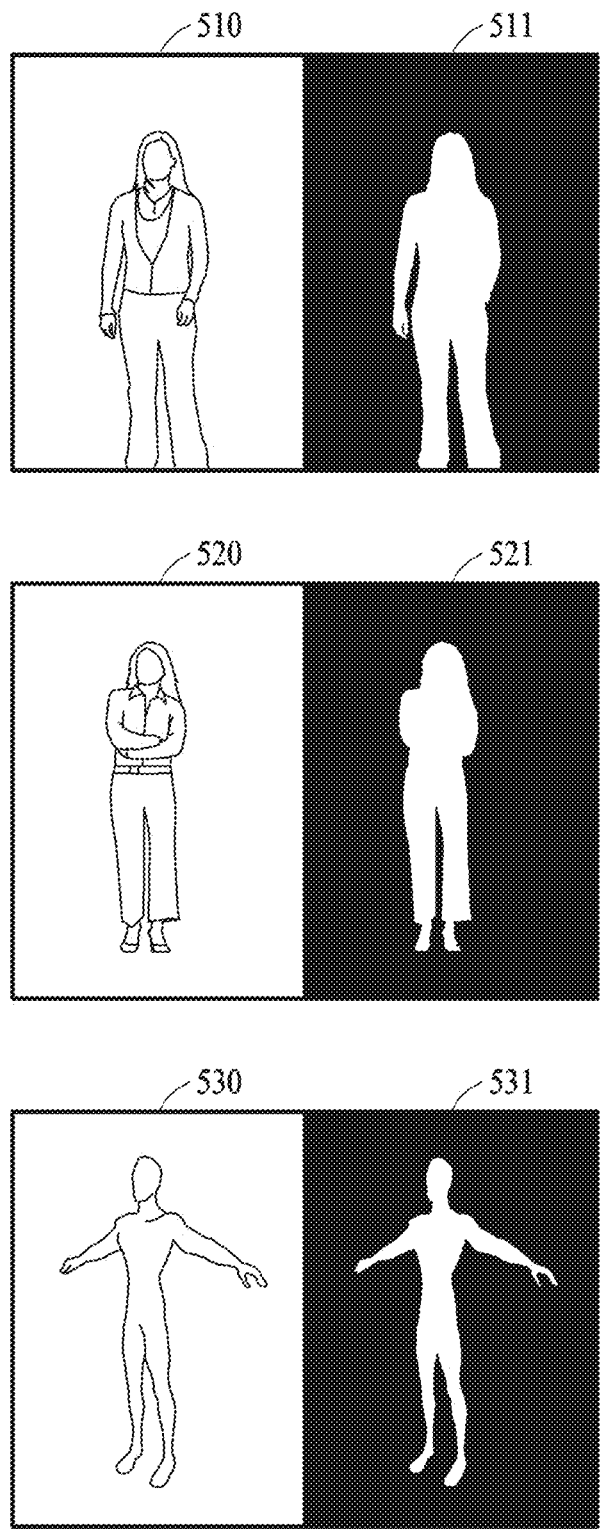
FIG. 5 is an example of a mask image generated according to an example embodiment.

FIG. 5 is an example of a mask image generated according to an example embodiment.

The generator 220 may define a difference in hues, which are visible to the eyes, although a distance of the colors is the same (that is, visually seeing a difference) as a visual difference. The generator 220 may generate mask images 511, 521, and 531 obtained by separating foregrounds from multi-view images 510, 520, and 530, by applying, to the multi-view images 510, 520, and 530, an algorithm of separating a foreground from a background using the visual difference.

Figure 6:
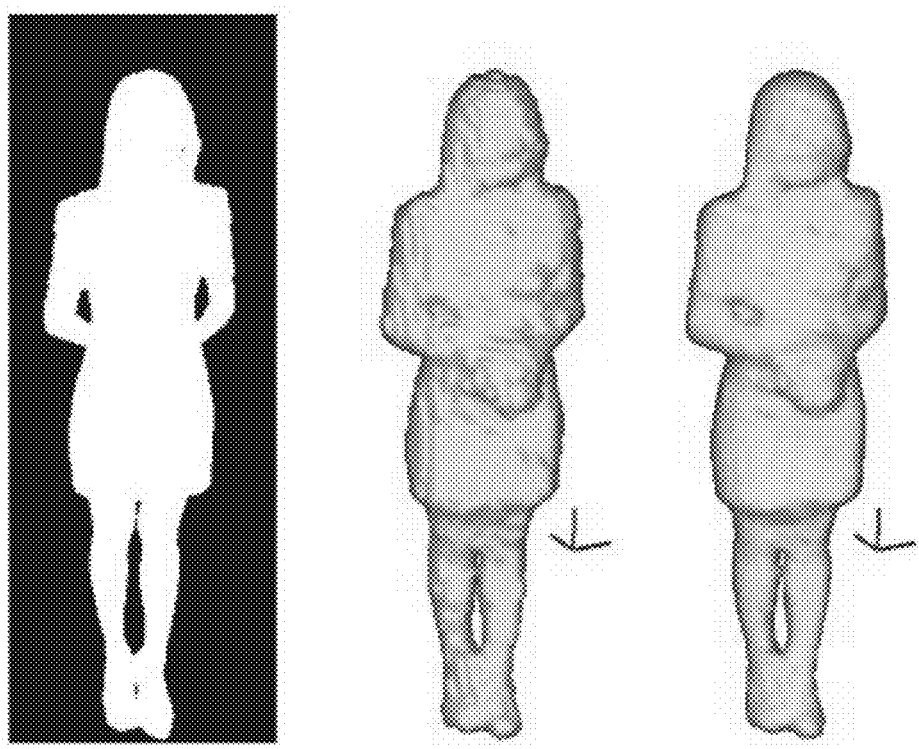
FIG. 6 is an example of a 3D mesh generated according to an example embodiment.

FIG. 6 is an example of a 3D mesh generated according to an example embodiment.

The generator 220 may generate selected surface voxels by projecting a mask image to a 3D space according to a visual hull technique. In addition, the generator 220 may generate the 3D mesh, as shown in FIG. 6, by using the perspective correction interpolation method for the generated surface voxels.

Figure 7:
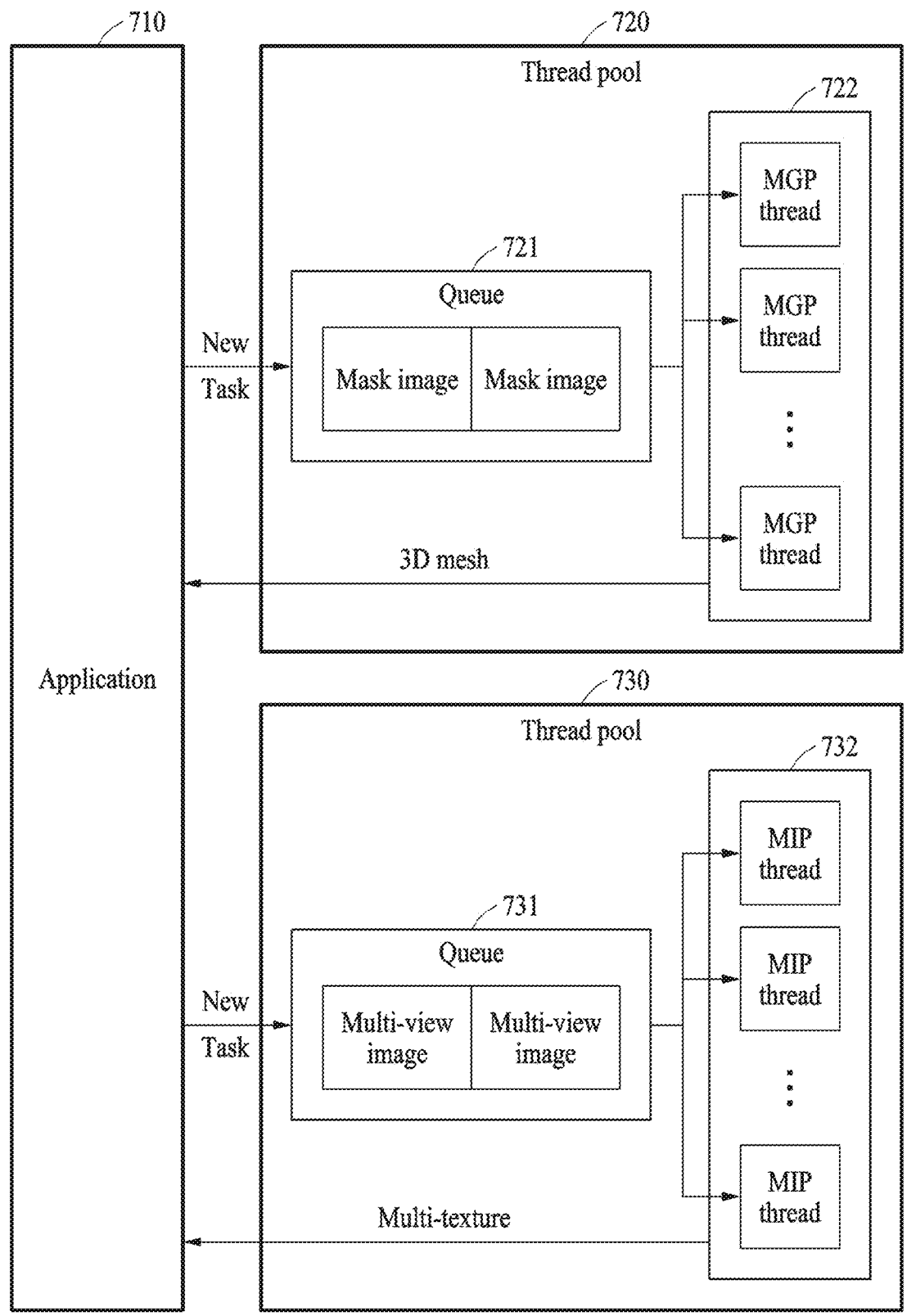
FIG. 7 is an example of generating a mask image and a multi-texture by a 3D model generator according to an example embodiment.

FIG. 7 is an example of generating a mask image and a multi-texture by a 3D model generator according to an example embodiment.

The 3D model generator 110 may generate a 3D mesh and a multi-texture in parallel by using a parallel processing method (thread).

However, an increase in the number of threads, in a situation with a large amount of parallel tasks, may cause an increase in processing throughput of a central processing unit (CPU) and an increase in size of a memory due to frequent generation and scheduling of threads, thereby deteriorating the performance of an application 710. Accordingly, the 3D model generator 110 may determine the number of threads in advance and provide tasks stored in a task queue respectively to threads in a thread pool, such that a thread pool efficiently using threads may be used.

Specifically, the 3D model generator 110 may be configured with the application 710, a thread pool 720 for generating a 3D mesh, and a thread pool 730 for generating a multi-texture. For example, the application 710 may be a program executed by a server or a PC.

The application 710 may convert the multi-view image into an RGB image and input the RGB image to the thread pool 730 as a new task. In addition, the application 710 may generate a mask image by separating the foreground from the RGB image. For example, the mask image may be a multi-view foreground image (multi-view mask image). In this case, the application 710 may input the mask image to the thread pool 720 as a new task.

The thread pool 720 may input mask images of one frame to a task queue 721 and input, to a mesh generation process thread (MGP thread) 722, a mask image, which is stored first among the mask images pre-stored sequentially in the task queue 721, to output a 3D mesh including 3D model information (Vertex, Normal, Face) to the application 710.

The thread pool 730 may input RGB images of one frame to a task queue 731 and input, to a multi-view image process thread (MIP thread) 732, an RGB image, which is stored first among the RGB images pre-stored sequentially in the task queue 721, to output a multi-texture.

Figure 8:
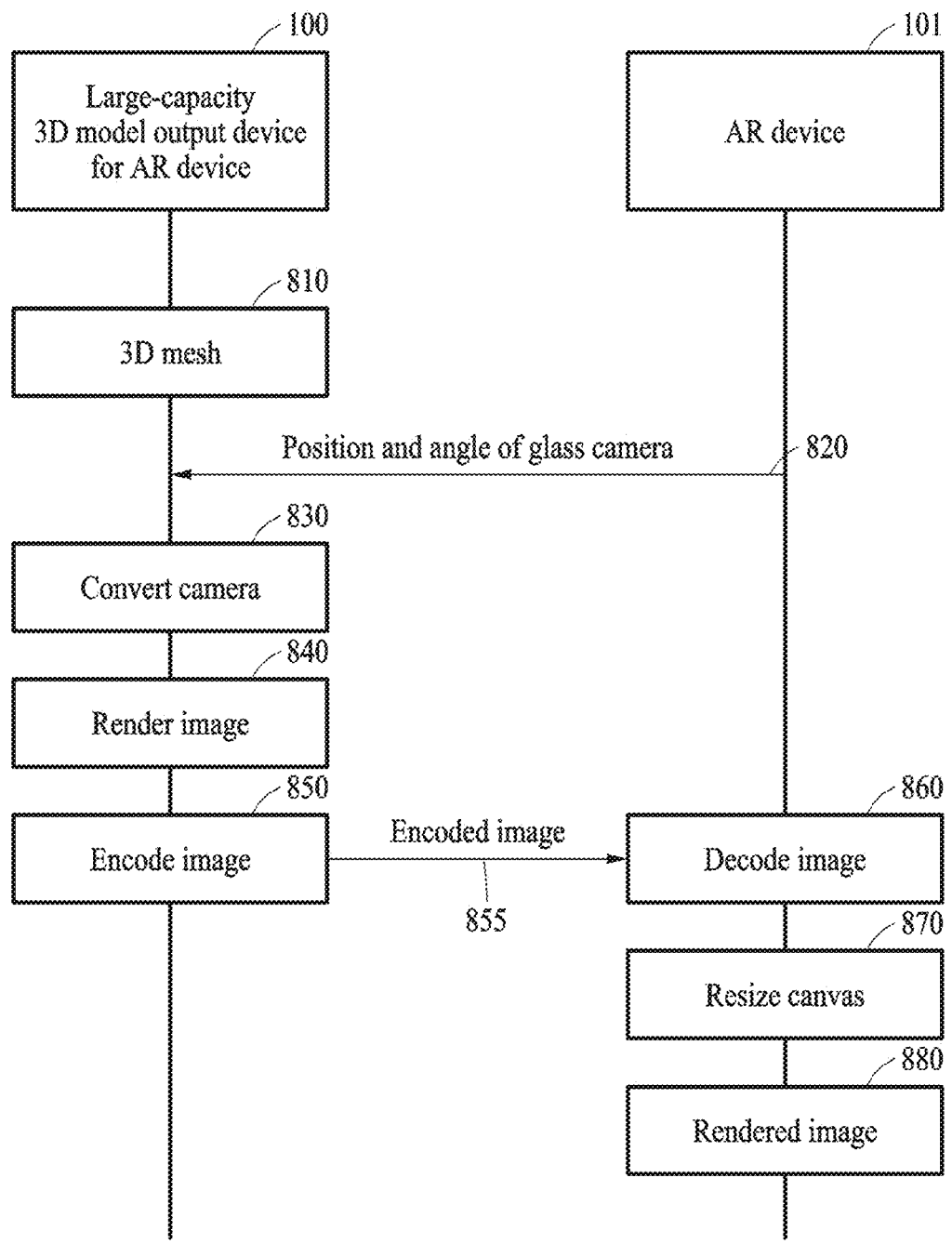
FIG. 8 is an example of outputting a 3D model to an AR device according to an example embodiment.

FIG. 8 is an example of outputting a 3D model to an AR device according to an example embodiment.

In operation 810, the large-capacity 3D model output device for the AR device 100 may generate a 3D model by applying a multi-texture to a 3D mesh.

In addition, the AR device 101 may identify the camera movement or rotation of the AR device 101 to generate the camera movement and rotation information of the AR device 101.

In operation 820, the large-capacity 3D model output device for the AR device 100 may receive, from the AR device 101, the camera movement and rotation information of the AR device 101.

In operation 830, the generator 260 may move a position of a virtual camera or rotate a virtual camera of the large-capacity 3D model output device for the AR device 100, according to the camera movement and rotation information of the AR device 101 received in operation 820. For example, the virtual camera may be a Unity camera set in a Unity program.

In operation 840, the generator 260 may generate a rendered image by rendering an image of a 3D model in a view, to which a camera of the AR device 101 is directed, according to the virtual camera with a position or an angle which is converted in operation 830.

In operation 850, the transmitter 270 may encode the rendered image generated in operation 840. In operation 855, the transmitter 270 may transmit the encoded image to the AR device 101.

In operation 860, the AR device 101 may decode the rendered image from the encoded image.

In operation 870, the AR device 101 may change the size of a raw image by controlling the size of a canvas according to the camera position of the AR device 101.

In operation 880, the AR device 101 may texture the rendered image into a raw image and output the rendered image to the display of the AR device 101.

Figure 9:
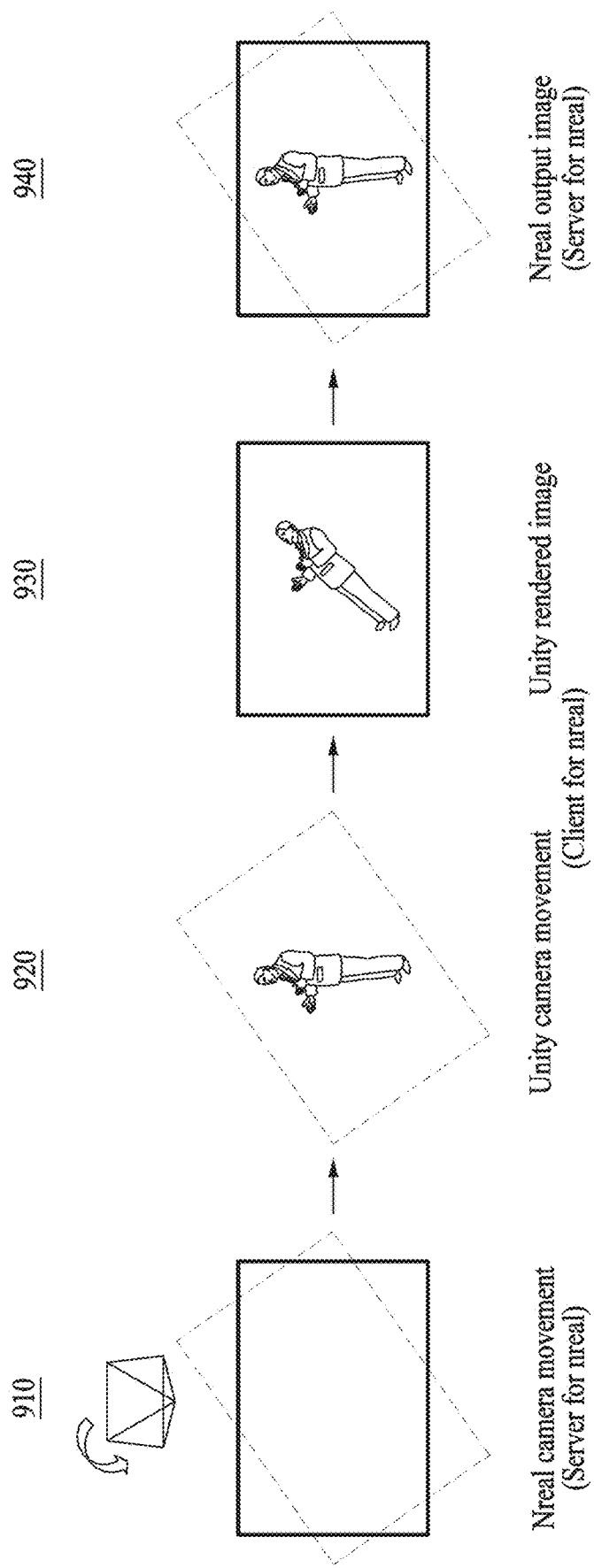
FIG. 9 is an example of rendering an image of a view according to rotation information of a camera during a process of outputting a 3D model to an AR device according to an example embodiment.

FIG. 9 shows that an image rendered by Nreal is finally shown, when the Nreal camera on a side of the AR device

101 (server for Nreal) moves, during the process of outputting the 3D model to the AR device 101, according to an example embodiment.

In operation 910, the Nreal camera on the side of the AR device 101 may rotate, as shown in FIG. 9. In this case, the AR device 101 may transmit camera movement and rotation information to the Unity camera on a side of the large-capacity 3D model output device for the AR device 100 through a user datagram protocol (UDP).

In operation 920, the large-capacity 3D model output device for the AR device 100 may change an angle of the Unity camera, as shown in FIG. 2, according to the camera movement and rotation information.

In operation 930, the large-capacity 3D model output device for the AR device 100 may generate a rendered image by rendering an object by using the Unity camera with an angle which is changed in operation 920. In this case, the generator of the large-capacity 3D model output device for the AR device 100 may obtain (glReadPixel) and encode the rendered image. In addition, the transmitter of the large-capacity 3D model output device for the AR device 100 may transmit the encoded image to the AR device 101 by using a TCP. In this case, the AR device 101 may decode the rendered image from the received image.

In operation 940, the AR device 101 may perform texture mapping of the rendered image to a raw image as a child node of the canvas, which is a Unity user interface (UI) of the server, and output the rendered image. In this case, the AR device 101 may render the object closer or farther by adjusting the size of the canvas. In addition, the raw image is an example of a UI capable of texturing a rendered image.

Figure 10:
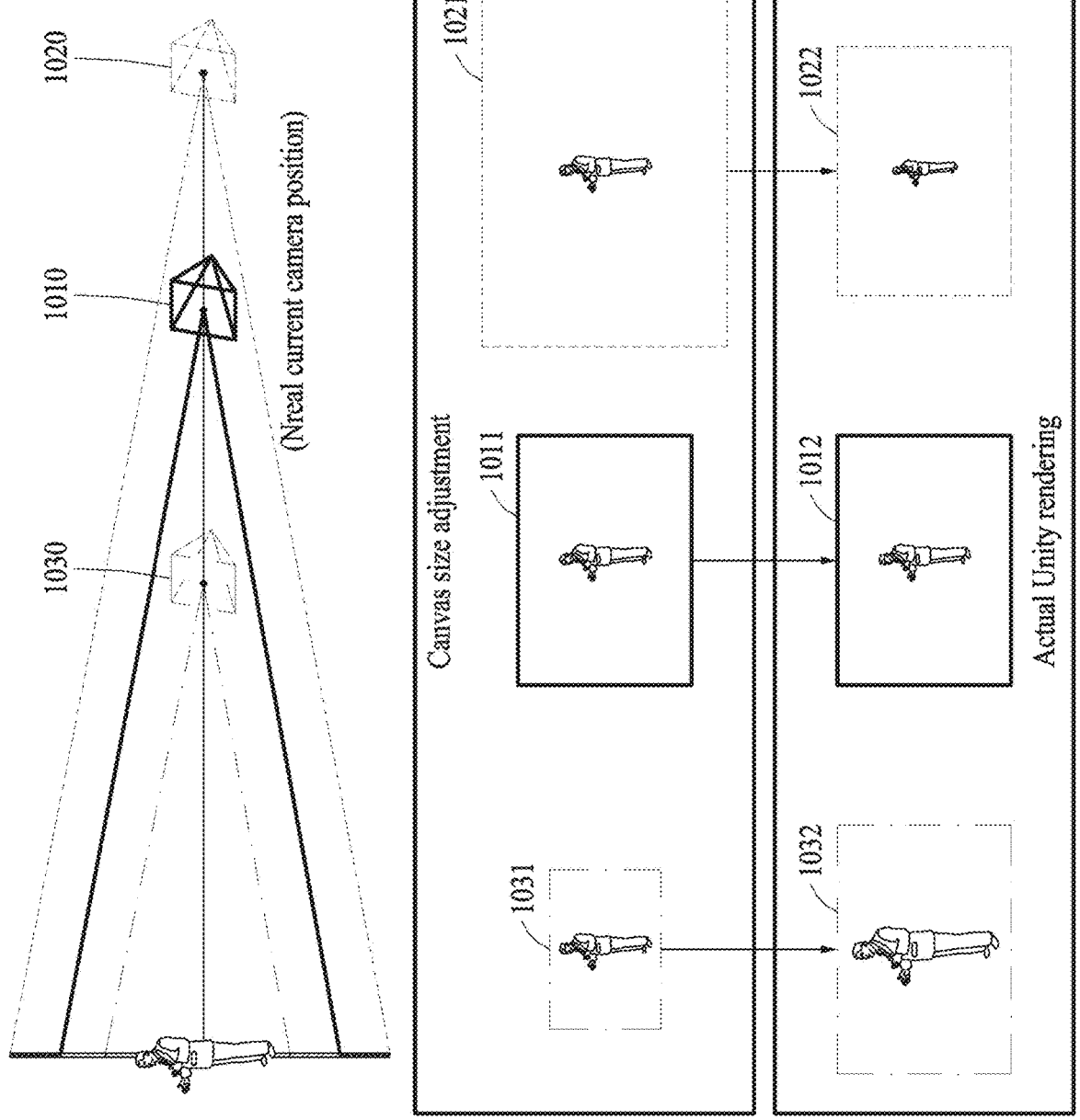
FIG. 10 is an example of rendering an image of a view according to movement of a camera during a process of outputting a 3D model to an AR device according to an example embodiment.

FIG. 10 is an example of rendering an image of a view according to movement of a camera during a process of outputting a 3D model to an AR device according to an example embodiment.

When the position of the Nreal Camera is a reference position 1010, the AR device 101 may maintain the size of a canvas as a reference size 1011. In this case, the size of an object included in a rendered image 1012, which is subjected to the texture mapping to a raw image and output by the AR device 101, may not change.

On the other hand, when the position of the Nreal Camera is a position 1020, which is farther from the object than the reference position 1010, the AR device 101 may change the size of the canvas to a size 1021, which is larger than the reference size 1011. In this case, as shown in FIG. 10, the size of the object included in the rendered image 1022, which is subjected to the texture mapping to the raw image and output by the AR device 101, may be reduced in inverse proportion to a ratio of the size 1021 of the large canvas increased from the reference size 1011.

Also, when the position of the Nreal Camera is a position 1030 closer to the object than the reference position 1010, the AR device 101 may maintain the size of the canvas as a size 1031 that is smaller than the reference size 1011. In this case, as shown in FIG. 10, the size of the object included in a rendered image 1032, which is subjected to the texture mapping to the raw image and output by the AR device 101, may reduce in inverse proportion to a ratio of the size 1031 of the large canvas increased from the reference size 1011.

Figure 11:
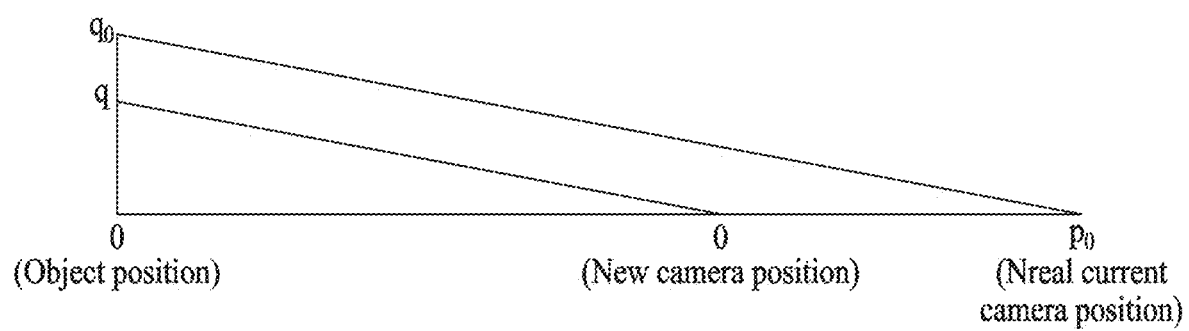
FIG. 11 is an example of controlling a canvas size according to movement of a camera during a process of outputting a 3D model to an AR device according to an example embodiment.

In this case, the size adjustment of the canvas may be calculated with reference to FIG. 11 and Equation 1.

$$\overline{op_o} : \overline{op} = \overline{oq_o} : \overline{oq}$$ [Equation 1]

$$\overline{oq} = \frac{\overline{oq_o} \times \overline{oq}}{\overline{op_o}}$$

In this case, $p_o$ may represent a reference position of an Nreal Camera, p may represent a changed position of the Nreal Camera, and o may represent a position of an object. In addition, $q_o$ may represent a reference size of a canvas and q may be a changed size of the canvas.

Figure 12:
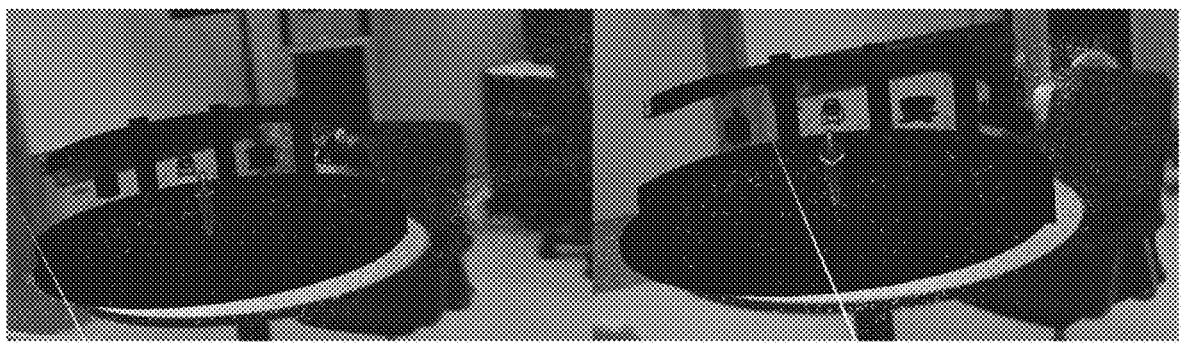
FIG. 12 is an example of a rendered image output from an AR device according to an example embodiment.

FIG. 12 is an example of a result obtained by performing texture mapping of the rendered image to the raw image and outputting the rendered image, after adjusting the size of the canvas, as in the example of FIG. 10.

Figure 13:
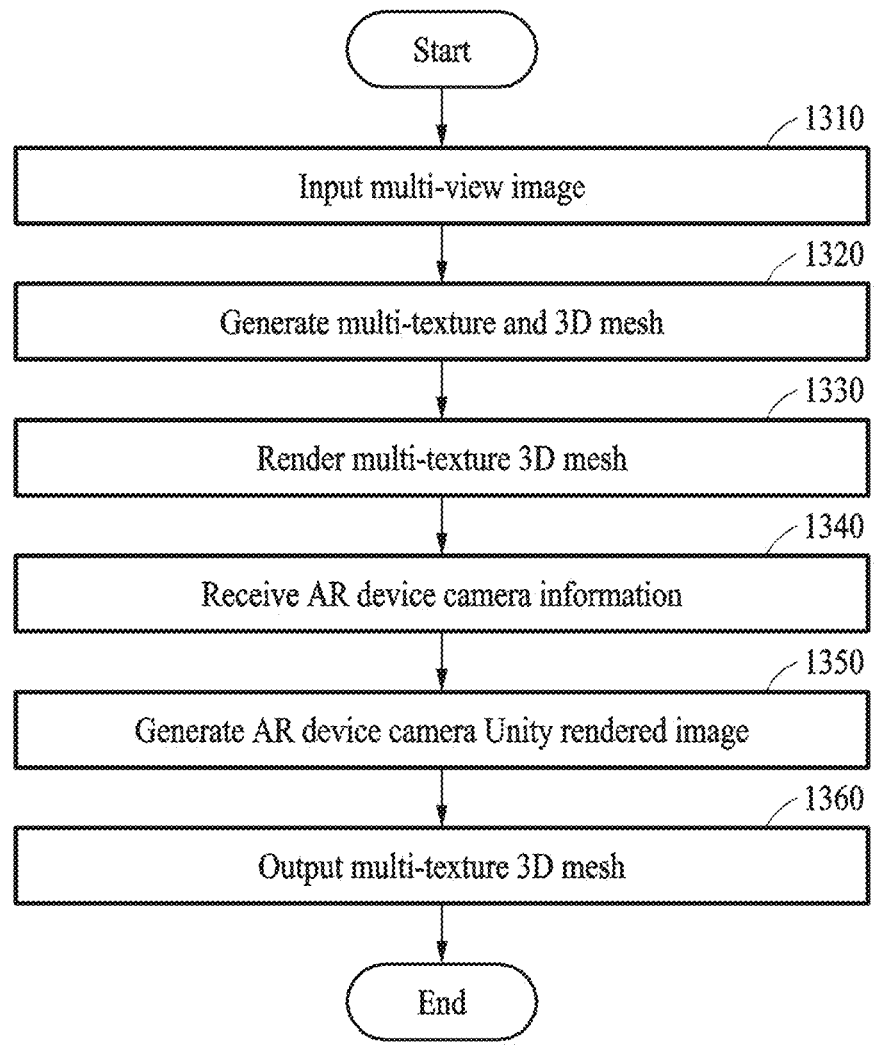
FIG. 13 is a flowchart illustrating a method of outputting a large-capacity 3D model for an AR device, according to an example embodiment.

FIG. 13 is a flowchart illustrating a method of outputting a large-capacity 3D model for an AR device, according to an example embodiment.

In operation 1310, the 3D model generator 110 may obtain a multi-view image. For example, the 3D model generator 110 may receive a multi-view image from a user or the AR device 101.

In operation 1320, the 3D model generator 110 may generate a multi-texture and a 3D mesh based on the multi-view image obtained in operation 1310.

In operation 1330, the 3D model generator 110 may transmit the multi-texture and the 3D mesh generated in operation 1320 to the AR device 101. In this case, the AR device 101 may generate a 3D model by rendering the multi-texture and the 3D mesh.

In operation 1340, the AR device outputter 120 may receive camera movement and rotation information of the AR device 101.

In operation 1350, the AR device outputter 120 may generate a rendered image by rendering an image of the 3D model in a view, to which a camera of the AR device 101 is directed, according to the camera movement and rotation information of the AR device 101. In this case, the AR device outputter 120 may transmit the rendered image to the AR device 101.

In operation 1360, the AR device 101 may output the rendered image. In this case, the rendered image may be a multi-texture 3D mesh Nreal glass image.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single example embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the disclosure, but are not intended to limit the scope of the disclosure. It will be apparent to those skilled in the art that various modifications based on the technical spirit of the disclosure, as well as the disclosed example embodiments, can be made.

What is claimed is:

1. A method of outputting a large-capacity 3D model for an augmented reality (AR) device, the method comprising:
   generating a multi-texture and a 3D mesh based on a multi-view image;
   generating a 3D model using the multi-texture and the 3D mesh; and
   transmitting, to the AR device, an image of the 3D model in a view, to which a camera of the AR device is directed, according to camera movement and rotation information of the AR device,
   wherein the AR device outputs the image in the view, to which the camera is directed.

2. The method of claim 1, wherein the generating the multi-texture and the 3D mesh comprises:
   obtaining the multi-view image;
   encoding the multi-view image to generate the multi-texture; and
   generating the 3D mesh by applying a perspective correction interpolation method to the multi-view image.

3. The method of claim 2, wherein the generating the multi-texture comprises:
   converting the multi-view image into an RGB image;
   converting the RGB image into a YUV image; and
   encoding the YUV image to generate the multi-texture.

4. The method of claim 2, wherein the generating the 3D mesh comprises:
   generating a mask image by separating a foreground from the multi-view image;
   generating a surface voxel by projecting a 3D space with the mask image; and
   generating the 3D mesh by applying the perspective correction interpolation method to the surface voxel.

5. The method of claim 1, wherein the generating the multi-texture and the 3D mesh comprises:
   generating the multi-texture and the 3D mesh in parallel by inputting the multi-view image to a thread pool for generating the multi-texture and a thread pool for generating the 3D mesh.

6. The method of claim 1, wherein the generating the 3D model comprises generating a 3D model by applying the multi-texture to the 3D mesh by using a shader.

7. The method of claim 1, wherein the transmitting the image to the AR device comprises:
   receiving, from the AR device, the camera movement and rotation information of the AR device;
   rendering the image of the 3D model in the view, to which the camera is directed, according to the camera movement and rotation information of the AR device to generate a rendered image; and
   encoding the rendered image and transmitting the rendered image to the AR device.

8. The method of claim 7, wherein the AR device performs operations of:
   decoding the rendered image from received information; and
   texturing the rendered image into a raw image and outputting the rendered image to a display of the AR device.

9. The method of claim 8, wherein the AR device changes a size of the raw image by controlling a size of a canvas according to a position of the camera of the AR device before texturing the rendered image into the raw image.

10. A method of generating a large-capacity 3D model for an augmented reality (AR) device, the method comprising:
    obtaining a multi-view image;
    encoding the multi-view image to generate a multi-texture;
    generating a 3D mesh by applying a perspective correction interpolation method to the multi-view image; and
    rendering the multi-texture and the 3D mesh in Unity to generate a 3D model.

11. The method of claim 10, wherein the generating the multi-texture comprises:
    converting the multi-view image into an RGB image;
    converting the RGB image into a YUV image; and encoding the YUV image to generate the multi-texture.

12. The method of claim 10, wherein the generating the 3D mesh comprises:
  generating a mask image by separating a foreground from the multi-view image;
  generating a surface voxel by projecting a 3D space with the mask image; and
  generating the 3D mesh by applying the perspective correction interpolation method to the surface voxel.

13. The method of claim 10, wherein the generating the 3D model comprises generating a 3D model by applying the multi-texture to the 3D mesh by using a shader.

14. A method of outputting a large-capacity 3D model for an augmented reality (AR) device, the method comprising:
  receiving a 3D model generated based on a multi-view image and camera movement and rotation information of the AR device;
  rendering an image of the 3D model in a view, to which a camera of the AR device is directed, according to the camera movement and rotation information of the AR device to generate a rendered image; and
  encoding the rendered image and transmitting the rendered image to the AR device,
  wherein the AR device outputs the image in the view, to which the camera is directed.

15. The method of claim 14, wherein the AR device performs operations of:
  decoding the rendered image from received information; and
  texturing the rendered image into a raw image and outputting the rendered image to a display of the AR device.

16. The method of claim 15, wherein the AR device changes a size of the raw image by controlling a size of a canvas according to a position of the camera of the AR device before texturing the rendered image into the raw image.

17. The method of claim 14, wherein the 3D model is generated by rendering, in Unity, a multi-texture generated by encoding the multi-view image and a 3D mesh generated by applying a perspective correction interpolation method to the multi-view image.

* * * * *